Patented June 17, 1947

2,422,625

UNITED STATES PATENT OFFICE 2,422,625

PROCESSES FOR THE PRODUCTION OF CHROMANES

Walter John, Gottingen, Germany; vested in the Attorney General of the United States No Drawing. Application December 12, 1939, Serial No. 308,827. In Germany June 29, 1939

Sections 3 and 14, Public Law 690, August 8, 1946.
Patent expires June 29, 1959

6 Claims. (Cl. 260—333)

This invention relates to new chemical compositions and compounds, and to methods of producing the same.

More particularly, the invention relates to the production of substituted chromanes having the biological activity of tocopherols, i. e., vitamin E.

In an application being filed concurrently herewith by the present applicant and another, now Patent 2,245,147, there is disclosed a process for the production of the compounds of the formula:

I 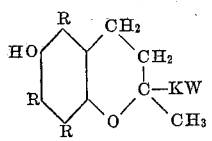

where R represents a methyl group, or two of the radicals R represent methyl groups and the remaining R represents hydrogen, and KW represents any monovalent higher hydrocarbon radical, by the condensation of a ketone of the formula II 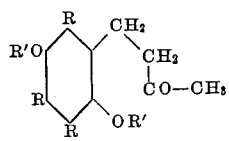

where R represents a methyl group or two R's represent methyl groups and the remaining R represents hydrogen and R' represents a hydrocarbon radical, with an organomagnesium halide, the tertiary alcohol thus formed being converted either spontaneously or by treatment with a dehydrating agent to the chromane of Formula I.

I have now found that this general procedure may be applied to the production of chromanes of the Formula I by the condensation of ketones of Formula II, where R' is a hydrogen atom. Such a process is illustrated in the following examples which are given by way of illustration and not of limitation and which, it will be understood, may be subjected to modifications and adaptations without departing from the spirit and scope of the invention described and claimed.

*Example I*

The 1-gamma-keto-butyl-3,4,6-trimethylbenzohydroquinone which is required as the starting material is prepared as follows:

3,4,6-trimethylbenzaldehyde [Ann. 347, 375 (1906)] is condensed with acetone by means of sodium alcoholate. A benzalacetone melting at 51° C., is thus formed, the aliphatic double bond of which may be easily hydrogenated catalytically. 2,5-dinitro-3,4,6-trimethylbenzylacetone melting at 135° C. is obtained by subsequent nitration. This nitro compound is reduced with stannous chloride in acetic acid. The tin double salt of 2,5-diamino-3,4,6-trimethylbenzylacetone thus obtained may be directly oxidized with ferric chloride to 1-gamma-keto-butyl-3,4,6-trimethylbenzoquinone, melting at 56° C. The same quinone may also be obtained by chromic acid oxidation of the quinone melting at 79° C. (Z. physiol. Chem. 257, 182), obtainable in good yields from 2, 5, 7, 8-tetramethyl-6-hydroxy chroman by oxidation with ferric chloride. Finally the quinone is reduced with zinc dust and glacial acetic acid to the desired 1-gamma-keto-butyl-3,4,6-trimethylbenzohydroquinone. This compound is recrystallized from ether and petroleum ether and melts at 122° C.

A Grignard solution is prepared from 2.3 gms. of magnesium with 14.2 gms. of methyliodide in 150 cc. ether. 1.1 gm. of 1-gamma-keto-butyl-3,4,6-trimethylbenzohydroquinone is just dissolved in ether with slight heating and slowly added to the boiling Grignard solution which has been decanted from magnesium. A thick precipitate is formed. The reaction mixture is kept boiling for 3 hours, the ether is distilled off and the remaining bright glassy mass is heated for 2 hours on the water bath with exclusion of air. The reaction product is decomposed with concentrated hydrochloric acid and as little ice as possible, meanwhile cooling with ice. Thereupon, ethanol is added to the mixture until a clear solution is obtained and, after the addition of some zinc dust, the solution is boiled for half an hour under refluxing while passing a slight current of hydrochloric acid gas. The colorless liquid is treated with 3 volumes of water and kept in the ice box. The main portion of 2,2,5,7,8-pentamethyl-6-hydroxychromane precipitates out directly in flat crystalline plates melting at 91° C. A further portion is obtained by extraction with ether. The compound is recrystallized from petroleum ether or dilute methanol. Melting point 93° C.

*Example II*

A Grignard solution is prepared from 1.15 gms. of magnesium and 12.5 gms. of dodecylbromide in 50 cc. ether. 1.1 gm. of 1-gamma-keto-butyl-3,4,6-trimethylbenzohydroquinone is dissolved in ether and slowly added to the boiling Grignard solution decanted free from magnesium. 50 cc. of benzene is added to the reaction mixture and sufficient ether is evaporated until the solution consists of about equal portions of ether and benzene. The reaction mixture is kept boiling for about 3 hours; the solvent is completely evaporated; the residue is decomposed with some ice and hydrochloric acid; and finally a double volume of alcohol is added. The mixture is heated to boiling for half an hour while passing a slight current of hydrochloric acid gas. On cooling, the solution is extracted with ether; the extract is washed with water and bicarbonate solution and dried; and the ether is again removed. The residue is twice evaporated to complete dryness with absolute alcohol, and then twice with absolute benzene. The residue is taken up with 300 cc. of benzene and then cyanic acid, obtained from 40 gms. cyanuric acid, is passed through while cooling with ice, and the reaction product is allowed to stand in the ice box for four days. For the working up of the allophanates, the reaction mixture is filtered off from cyamelide and the precipitated allophanate of the dodecyl alcohol, melting point 159° C. It is once more taken up with benzene whereby more allophanate, M. P. 159° C. precipitates out in the cold. The compound is taken up with acetone, whereby a hydrocarbon $C_{24}H_{50}$, M. P. 52° C., remains undissolved or precipitates out readily in fine plates and, likewise, the remainder of the allophanate of the dodecyl alcohol precipitates out almost completely while the more readily soluble allophanate of the dodecyltetramethylhydroxychroman remains in the mother liquor. After the evaporation of the acetone, the residue is taken up with methanol, from which the allophanate of 2-dodecyl-2,5,7,8 - tetramethyl - 6 - hydroxychroman, melting at 170° C., separates out in fine crystals. By recrystallization from methanol, a product of melting point 180° C. is obtained. The ultra-violet spectrum is identical with that of $\alpha$-tocopherylallophanate.

I claim:

1. In a process for the production of chromanes, the step comprising heating 1-gamma-keto-butyl-trimethyl-benzohydroquinone with an alkyl magnesium halogenide.

2. In a process for the production of chromanes, the step comprising heating 1-gamma-keto-butyl-trimethyl-benzohydroquinone with methyl magnesium iodide.

3. In a process for the production of chromanes, the step comprising heating 1-gamma-keto-butyl-trimethyl-benzohydroquinone with dodecyl magnesium bromide.

4. A process for the production of chromanes, comprising heating a 1-gamma-keto-butyl-trimethyl-benzohydroquinone with an alkyl organomagnesium halogenide, heating the Grignard reaction product with a chloride selected from the group consisting of hydrogen chloride and zinc chloride, and separating the chromane thus obtained.

5. A process for the production of chromanes, comprising heating 1-gamma - keto - butyl-trimethyl-benzohydroquinone with methyl magnesium iodide, heating the Grignard reaction product with a chloride selected from the group consisting of hydrogen chloride and zinc chloride, and separating the chromane thus obtained.

6. A process for the production of chromanes, comprising heating 1-gamma - keto - butyl-trimethyl-benzohydroquinone with dodecyl magnesium bromide, heating the Grignard reaction product with a chloride selected from the group consisting of hydrogen chloride and zinc chloride, and separating the chromane thus obtained.

WALTER JOHN.

REFERENCES CITED

The following references are of record in the file of this patent:

Claisen et al., Berichte der Deutsche Chemische Gesellschaft, vol. 59 (1926), pp. 2344 to 2351.